(12) United States Patent
Denais et al.

(10) Patent No.: US 10,140,653 B2
(45) Date of Patent: Nov. 27, 2018

(54) LOCKED ASSET RENTAL SYSTEM

(71) Applicants: Vince Denais, Bryan, TX (US); Andre Denais, Bryan, TX (US)

(72) Inventors: Vince Denais, Bryan, TX (US); Andre Denais, Bryan, TX (US)

(*) Notice: Subject to any disclaimer, the term of this patent is extended or adjusted under 35 U.S.C. 154(b) by 0 days.

(21) Appl. No.: 15/663,717

(22) Filed: Jul. 29, 2017

(65) Prior Publication Data

US 2017/0337622 A1    Nov. 23, 2017

Related U.S. Application Data

(63) Continuation-in-part of application No. 14/463,628, filed on Aug. 19, 2014, now abandoned.

(60) Provisional application No. 61/923,617, filed on Jan. 3, 2014.

(51) Int. Cl.
| | |
|---|---|
| *H04L 29/00* | (2006.01) |
| *G06Q 30/06* | (2012.01) |
| *G06Q 30/04* | (2012.01) |
| *G07C 9/00* | (2006.01) |
| *G06Q 20/34* | (2012.01) |
| *G06K 7/08* | (2006.01) |
| *G06Q 20/14* | (2012.01) |
| *G06Q 20/38* | (2012.01) |
| *G06Q 20/40* | (2012.01) |
| *G07F 17/00* | (2006.01) |

(52) U.S. Cl.
CPC ........ *G06Q 30/0645* (2013.01); *G06K 7/087* (2013.01); *G06Q 20/145* (2013.01); *G06Q 20/34* (2013.01); *G06Q 20/3829* (2013.01); *G06Q 20/40* (2013.01); *G06Q 20/4012* (2013.01); *G06Q 30/04* (2013.01); *G07C 9/00142* (2013.01); *G07F 17/0057* (2013.01)

(58) Field of Classification Search
CPC ......... G06Q 30/0645; G06Q 20/4012; G06Q 20/3829; G06Q 20/145
See application file for complete search history.

(56) References Cited

U.S. PATENT DOCUMENTS

| | | | | |
|---|---|---|---|---|
| 3,665,397 | A * | 5/1972 | Di Napoli | G06Q 10/087 340/5.42 |
| 2010/0245128 | A1* | 9/2010 | Kanof | B62H 3/00 340/932.2 |
| 2015/0007619 | A1* | 1/2015 | Finney | G07F 17/10 70/58 |
| 2016/0133074 | A1* | 5/2016 | Amdahl | G07C 9/00571 340/5.54 |

* cited by examiner

*Primary Examiner* — Ellen Tran
*Assistant Examiner* — Helai Salehi
(74) *Attorney, Agent, or Firm* — William Lovin & Associates LLC; William R. Lovin

(57) ABSTRACT

The invention is a system allowing for the commercial rental of physical assets that are locked and secured at specific locations, including, without limitation, bicycles, motorcycles, automobiles, tools, machines, computers, smart phones, or tablet computers.

14 Claims, 7 Drawing Sheets

LOCKED ASSET RENTAL SYSTEM

CROSS-REFERENCE TO RELATED APPLICATIONS

This application claims benefit of U.S. patent application Ser. No. 14/463,628 filed Aug. 19, 2014 which claims benefit of U.S. Prov. App. No. 61/923,617 filed Jan. 3, 2014 and hereby incorporates them in their entirety by reference.

FIELD OF THE INVENTION

The present invention relates to a system for the commercial rental of physical assets locked and secured at a specific location, more specifically, the rental of bicycles, motorcycles, automobiles, and tools.

BACKGROUND OF THE INVENTION

Bike rental systems are well known in the prior art. There are four general schemes varying in complexity and cost:

The simplest is an "ad hoc" bike sharing system in which bicycles are distributed over a geographic area such that they may be used by anybody. The bikes are not locked, physical security is very low, and shrinkage and vandalism may be high. As a result, such bikes are painted or constructed such that outright theft is discouraged. Bikes can be taken anywhere and left anywhere where other users may simply pick them up and ride away. This type of system is not particularly efficient from a traffic management and resource allocation point of view because bikes go where their ad hoc users take them and over time bikes tend to be distributed to places where relatively few other users need them. This necessitates periodic pickup and redistribution to more heavily trafficked locations.

The next simplest system is the "bike corral" bike sharing system. Bike corrals physically secure the bicycles in a storage area monitored by an attendant who checks the bikes in and out of the corral when users return and take them. This system obviously requires an attendant, but otherwise costs little more than an ad hoc bike sharing system. Having an attendant has the extra benefit of allowing the system operator to ensure that the proper rental fees are collected upon rental or return. The attendant has to be physically present, of course, so the bikes may not be available 24 hours a day or on holidays, etc.

The next most expensive type of system is the "automated key station" bike sharing system. This type of system features remotely controlled key stations, each capable of dispensing a key to a particular bike stored on a bike rack. The key releases the bike from the rack, thus allowing the user to take and use the bike. The lock used to affix the bike to the storage rack is permanently attached to the bike and can be used to attach the bike to another rack or fixed object during use. When finished riding the bike, the user locks the bike to the rack from whence he or she obtained it, and returns the key to the key station. The key stations are connected to a network and a controller that tracks when keys are dispensed, returned, and to whom they were dispensed. Users identify themselves to the system by means of a card swipe with keycode verification. Such systems are bought and operated by large institutions such as schools, manufacturers, theme parks, and so on that operate closed, or relatively closed, campuses. Because these systems are relatively inexpensive, they are invariably not used to generate revenue from per usage transactions. In fact, none of these systems possess the accouterments of a commercial system that would allow per usage operation by individual users. Such systems are operated in-house by the institution for the institution.

The most expensive type of system is the "kiosk based" bike sharing system. These feature custom built kiosks with attached automatic dispensing racks controlled by the kiosk. These are the most powerful and flexible, being attached to a network and controller that offers a fully featured user interface with web access that allows users to rent, pay for, and reserve bikes at anytime from anywhere. These types of systems are bought and installed by municipalities and other governmental entities that wish to operate a system that generates revenue from per usage bike rental transactions to underwrite the cost of installing and operating the system. These systems also provide added security in urban environments where shrinkage and vandalism are known issues. Users sign up and provide a means of payment by means of the web interface and pick up and return bikes to any kiosk in the system.

While institutions such as colleges and universities deploy bike share systems, invariably they are ad hoc or automated key station type systems. The principle reason is cost. Both of these systems are less expensive to deploy and operate than kiosk based systems. Since these institutions ordinarily do not view operating ancillary revenue generating concerns as one of their core competencies they greatly prefer to buy and deploy less expensive systems and amortize them through higher tuition and fees that are easily passed on to students and parents. Unfortunately, some colleges, particularly smaller private colleges, no longer have the luxury of passing such costs along. Unless the institution has a large endowment generating funds for capital investments, tuition creep has forced these smaller institutions to be more frugal. Outsourcing the operation of a bike sharing system is one way of doing this. As importantly, the ready availability of loans funds and the protracted softness in the economy have caused enrollments at many colleges and universities to swell. This presents yet another reason for outsourcing ancillary, non-core competency to third parties.

Moreover, swelling enrollments have taxed institution operated housing facilities and given rise to legions of independent student housing providers. These housing facilities compete with each other for tenants and thus have a vested interest in offering a full range of comfort and convenience features such as exercise facilities, pools, Jacuzzis, and so on. These operators have come to view an on-premises bike sharing system as an essential comfort and convenience feature and as marketing advantage.

As a result, independent bike share operators have emerged to provide bike share systems in cooperation with educational institutions and their neighboring independent student housing providers. These independent operators face a unique set of challenges and require a different kind of bike share system than the ones that are available. First, these operators must generate revenue from per usage transactions to underwrite their capital expenditure and operation. Second, university campuses and their neighboring independent student housing providers collectively comprise a relatively closed environment and bike rentals are generally "out and back" transactions versus "point-to-point" transactions. Students usually ride to class or some other location on campus and then return to their living quarters. This presents a significant cost-savings opportunity because expensive kiosk-based systems are not needed—indeed they are disadvantaged—in such environments. Third, to allow per usage operation by tech-savvy students who expect fully functional user experiences and the ability to sign up, pay, reserve, and interact with the system the way they buy music or rent movies online, a fully featured user interface with web access is a necessity. Fourth, while institutions and their neighboring independent student housing providers may have no interest in deploying and operating a system, they invariably want a system that provides visibility into the functioning of the system to understand how their students/tenants are using it. Fifth, in accordance with their need to generate revenue and ultimately a profit, an automated means of indirectly detecting that a bike has gone missing from the operator's fleet or has been damaged and is no longer deemed suitable for rental by users must be provided. With these diverse goals in mind, conventional automated key station systems do not offer sufficient functionality and kiosk-based systems suffer from the economic impediment that they are far too costly to be economically viable on smaller scales.

Further, the rental of generic locked assets has become a crucial part of commercial enterprise. For example, the rental of tools and equipment from home improvement centers has become a large component of the business conducted there. The rental of computers and tablet computers has become a large component of the business of libraries, educational institutions, airports, or travel hubs. The rental of automobiles, now generally requiring human interaction to facilitate, is becoming far more automated with increasingly large numbers of renters depending only on a check-out employee when the driver leaves the rental facility. Picking up the car and key is an automated process today.

Therefore, it is a first goal of the present invention to provide an automated key station locked asset rental system attached to a network and controller that offers a fully featured user interface with web access that allows users to rent, pay for, and reserve locked assets at anytime from anywhere.

It is a second goal of the present invention to provide an automated key station locked asset rental system interfaced to a third-party payment processing system so that users and operators can securely pay and receive payment for system usage while the operator reduces the potential liability from maintaining user payment information.

It is a third goal of the present invention to provide institutional partners with sufficient, limited access to the system that the partner can understand how their students and/or customers are using it.

It is a fourth goal of the present invention to provide an automated key station locked asset rental system capable of indirectly detecting that a locked asset has gone missing from the operator's fleet such that recovery operations may be commenced or that an asset has been damaged and is no longer deemed suitable for rental by users and must be repaired or replaced.

SUMMARY OF THE INVENTION

While the exemplary embodiment of the present invention facilitates the commercial rental of bicycles, it will be readily apparent to one having skill in the art that other locked or lockable items or commodities may be rented using the same type of system. For example, without limitation such a system may be used to rent motorcycles or cars at an airport or other travel hub, rent tools and machines at a home improvement store, or rent computers, smart phones, or tablet computers at a library, educational institution, airport, or travel hub. Some of these assets, like motorcycles and cars, intrinsically have keys and are large enough that they are somewhat immune to theft. Some of these assets, such as bicycles, tools, machines, computers, smart phones, and tablet computers, do not have keys and are often compact enough that they are easily stolen. Thus, a rental system of the present invention for these types of assets will require a lockable storage facility to secure the asset between rentals. For example, in the exemplary embodiment of the present invention bicycles are locked to racks between rentals. An alternative embodiment of the present invention would have a tool, a computer, or a tablet computer locked in a secured closed storage facility.

The exemplary embodiment of the present invention comprises five software/hardware components: 1) A web server application presenting a user sign-up interface; 2) An SQL database for storing user related contact and account information; 3) A billing/reporting application; 4) An automated key station server and at least one connected key station for dispensing and storing keys; and, 5) A web-accessible third party electronic payment authorization portal. These subsystems work together to facilitate the user account creation, maintenance, and billing aspects of the locked asset rental system. The hard physical components of the locked asset rental system comprise conventional racks with rental bicycles each secured to the rack by means of conventional keyed locks. The keyed locks are permanently affixed to the bikes thus allowing the user to use the lock to affix a bike to a stationary object while not in use. An alternative embodiment of the present invention would feature a cabinet containing secured closed storage facilities that might each contain a tool, a computer, or a tablet computer.

When a user first visits the system operator's website, they are prompted to sign up for an account by means of a web server-based user sign up application presenting a user sign-up interface. The user enters contact information such as their name, email address, phone number, etc. and selects a physical locked asset rental location from a list of physical locations from which they would like to rent locked assets. This account related information is stored in the SQL database.

Next, the sign-up application forwards the user to an independent, third-party electronic payment authorization web portal to input the necessary contact information and information describing the method of electronic payment necessary to use the system. The electronic payment authorization system returns a unique profile identifier (PID) to the sign-up application which stores it in the SQL database associated with the user's contact information and desired physical locked asset rental locations.

Next, the sign up application creates a network connection with the automated key station server associated with the key station(s) located at the physical location(s) from which the user would like to rent locked assets. The key station server creates a unique user identifier (UID) and personal identifying number (PIN) allowing access to the desired key station(s) and returns them to the sign-up application which stores them in the SQL database associated with the user's contact location and desired physical locked asset rental location(s) and unique profile identifier (PID). The sign-up application sends a confirmation email to the user's selected email address communicating the automatically generated UID and PIN to the user.

Next, at the selected key station, a user simply enters his or her UID and PIN on a key panel incorporated in the key station. Alternately, the user may swipe an optional magnetic ID card or insert a smart card associated with their UID and PIN after first manually logging into the key station and associating the desired magnetic ID card or smart card with their manually entered UID and PIN. A key for a particular locked asset is dispensed to the user, and a rental transaction record containing the Key ID (KID), the time it was dispensed, and the UID of the user to whom it was dispensed is logged in a transaction log in the key station server. The key station and the keys stored within it are associated with each other by means of an RFID link or physical key slot (or storage bin) so that when the user returns the locked asset and appropriately replaces the key in the key station, a matching return transaction record is logged on the transaction log.

Periodically afterwards, the billing/reporting application collects the transaction log from the key station server. Return transaction records are compared with corresponding rental transaction records and the user's total rental time and charge for the billing period is calculated. The billing application calculates the amount due for the billing period and contacts the electronic payment authorization portal with the user's PID and the total amount to be debited. The electronic authorization portal debits the user's associated electronic payment account and credits the system operator's electronic payment account. At the same time the billing/reporting application compares return transaction records with corresponding rental transaction records to identify transactions associated with a particular Key ID (KID) ranging in length below about 10 minutes. Such short transactions are usually not indicative of actual rental transactions but are instead indicative of a locked asset that is no longer present at the rental station and fleet shrinkage may have occurred. By the same token, such short rental cycles may indicate that a locked asset has been damaged and is no longer deemed suitable for rental by users and thus must be repaired or replaced. In either case, after one or more short rental transactions associated with a particular Key ID (KID), a physical inventory of the rental station may be made and recovery operations may commence with the renter associated with the last rental transaction of nominal length or a damaged locked asset may be recovered and repaired or replaced.

DETAILED DESCRIPTION OF THE PREFERRED EMBODIMENT

In the following discussion references are made to a variety of enabling technologies and techniques traditionally used to deploy software-based web services. For example, the term "application" will be used to connote one or more software applications or programs resident on a one or more web-servers, client devices, or computers operating individually or in concert to achieve a certain set of operational features. Similarly, the term "report" will be used to connote an information presentation by means of an electronic display or printed form. Similarly, web-based systems are implemented in various ways all of which are functionally equivalent. For example, in the following description of the exemplary embodiment, ASP.NET and C# are the preferred web development and program development languages, respectively. Those having skill in the art will recognize that numerous other equivalent development environments that may be used. For example, PHP is a well-known web development language and compiled system service routines written in numerous compiled languages (including C#) may be freely integrated. Thus, it will be readily apparent that such methods of deploying a web-based system are functionally equivalent to the method described and all such methods are included in the spirit and scope of the present invention. Similarly, in the following description of the exemplary embodiment, Microsoft® SQL is identified as the preferred database engine. Those having skill in the art will recognize that numerous functional equivalents such as MySQL® are commonly available and that all such equivalents are included in the spirit and scope of the present invention. Similarly, in the following description of the exemplary embodiment, a Microsoft® Windows® web server is identified as the preferred web server. Those having skill in the art will recognize that numerous functional equivalents such as Apache® are commonly available and that all such equivalents are included in the spirit and scope of the present invention.

Similarly, references are made to hardware components capable of dispensing keys and recording the identity of the individual to whom a particular key was dispensed. In this exemplary embodiment, reference is made to the Morse Watchmans® automated key station server and associated key stations. Those having skill in the art will readily recognize that other equivalent devices are commercially available and readily adapted to the teachings of the present invention.

Figure 1:
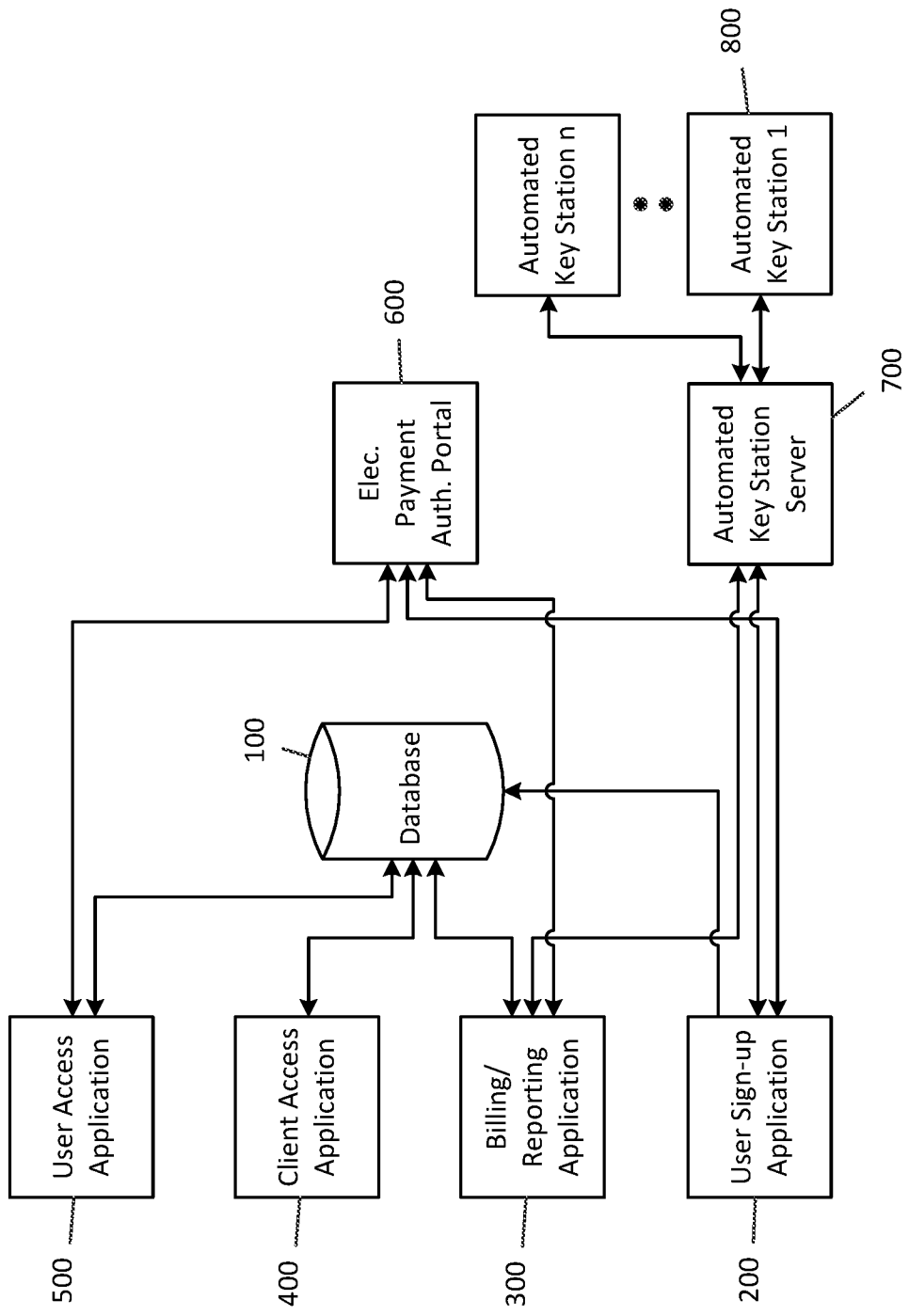
FIG. 1 is a flow diagram showing the operational flow in an exemplary embodiment of the present invention.

Turning now to FIG. 1, the exemplary embodiment of the present invention comprises the following software and hardware components: 1) A Microsoft® Windows® web server equipped with a Microsoft® SQL database 100 for storing user related contact and account information; 2) An ASP.NET/C# program implementing a user sign-up application 200; 3) A billing/reporting application 300 comprising: a) A C# program implementing an automated billing/reporting function; and, b) An ASP.NET/C# program implementing an ad-hoc billing/reporting function; 4) An ASP.NET/C# program implementing a client access application 400; 5) An ASP.NET/C# program implementing a user access application 500; 6) A Morse Watchmans® automated key station server 700 and at least one key station 800 capable of: a) Dispensing individual keys and maintaining a record of the user to whom the key was dispensed and when it was dispensed; b) Identifying and securely storing keys when they are returned and maintaining a record of when the key was returned; and, c) Communicating these records in the form of a transaction log to the various applications that require it; and, 7) A web-accessible third party electronic payment authorization portal 600 such as the such as the Authorize.NET® payment gateway. All these components communicate by means of a network such as the Internet and work together to facilitate the user account creation, maintenance, and billing aspects of the physical bike share system.

The hard physical components of a bike share system comprise conventional racks with rental bicycles each secured to the rack by means of conventional keyed locks. The keyed locks are permanently affixed to the bikes thus allowing the user to use the lock to affix a bike to a stationary object while not in use. Similarly, the hard physical components of a generic locked asset rental system comprise a cabinet containing secured closed storage facilities that might each contain a tool, a computer, or a tablet computer each of which is accessed by means of a conventional key.

Figure 2:
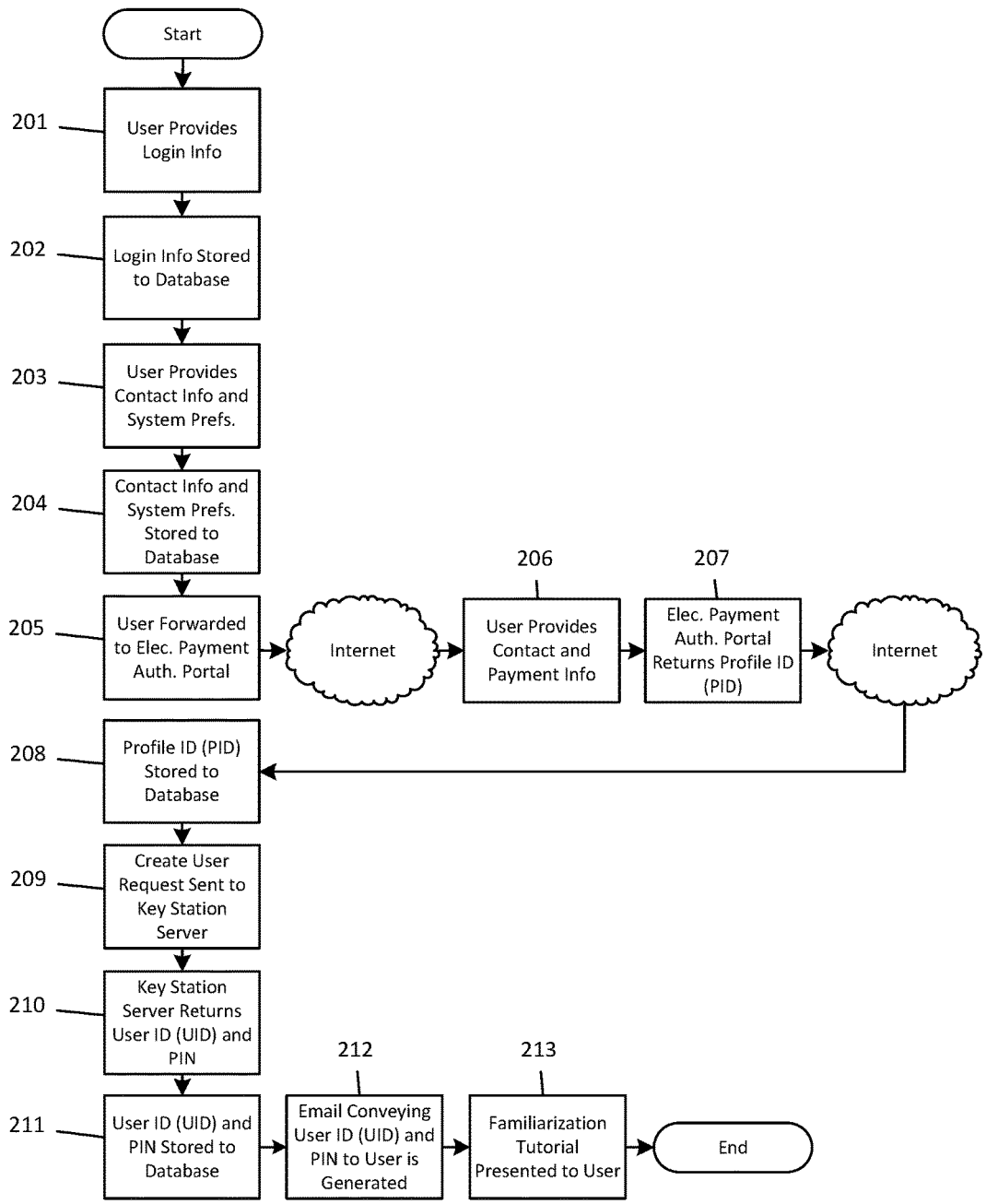
FIG. 2 is a flow diagram illustrating the process of creating a new account and associating a means of making electronic payments with the newly created account.

Referring now to FIGS. 1 and 2, when a user first visits the locked asset rental website, they are solicited to sign up for an account by means of user sign-up application 200 implemented as an ASP.NET/C# program running on a Microsoft Windows-based web server. Sign-up application 200 prompts the user to create an account by providing sign up information such as a username, password, and email address (201). User sign up application 200 stores this information in SQL database 100 (202). While this exemplary embodiment of the present invention comprehends using an ASP.NET Profile for this purpose and other user-centric data storage purposes, those having skill in the art will readily recognize that numerous other techniques for storing user specific information in databases are well known in the art and that all such techniques are included in the spirit and scope of the present application.

Next, the user is prompted to provide contact information such as their name, address, and telephone number in addition to providing system specific usage information, particularly the location of one or more locked asset rental locations from which they would like to rent assets (203). This contact information and system preference information is then stored to SQL database 100 (204).

Next, the user is directed to an Internet accessible, third-party electronic payment portal such as Authorize.NET (205). Here, the user enters basic contact information and provides a some form of electronic payment credential such as a debit card, credit card, or student/guest ID card (206). An Authorize.NET customer profile is then created and an Authorize.NET Profile ID (PID) is returned to ASP.NET/C# user sign-up application 200 (207). User sign-up application 200 then stores the returned PID to SQL database 100 (208).

Next, a network connection is created with an automated key station server 700 such as a Morse Watchmans automated key station server associated with physical key station (s) 800 at the location(s) where the user wishes to rent locked assets and user sign up application 200 sends a request directing automated key station server 700 to create login credentials for the user (209). Automated key station server 700 generates an authorized User ID (UID) and personal identifying number (PIN) and returns both to the user sign-up application 200 (210).

Next, ASP.NET/C# user sign-up application 200 creates an entry in SQL database 100 that links: 1) The returned User ID (UID) and PIN from automated key station server 700; 2) The user's ASP.NET Profile; and, 3) The user's Authorize.NET Profile ID (PID) for billing and account maintenance purposes (211).

Next, a confirmation email is sent to the user's selected email address communicating the UID and PIN automatically generated by automated key station server 700 to the user (212).

Finally, the user is presented with a few orientation slides or a video presentation to familiarize them with first time use of the system (213).

At automated key station 800, the user authenticates and gains access by entering his or her User ID (UID) and PIN on a built in key panel. After first manually authenticating this way, the user may optionally associate a magnetic stripe ID or smart card with their access credentials. The user does this by swiping the desired magnetic stripe ID card or inserting the smart card into a magnetic stripe card reader or smart card reader, respectively, built into key station 800. Subsequently, the user may gain access to automated key station 800 by: 1) Swiping the associated magnetic swipe card; 2) Inserting the smart card; or, 3) Manually entering his or her access credentials on the key panel.

Providing the user does not already have a locked asset rented, after gaining access to automated key station 800, a key for a locked asset is dispensed and a rental transaction record containing the identity of the key (Key ID or KID), the date and time it was dispensed, and the User ID (UID) of the user to whom it was dispensed is logged in a transaction log on the associated automated key station server 700. Assuming the user already has a locked asset rented, when the user subsequently returns and gains access to automated key station 800 a key is not dispensed. Rather, when the user replaces the key for his previously rented locked asset, a return transaction record is logged on the transaction log kept on the associated automated key station server 700. In this exemplary embodiment, physical control of the keys is mediated by means of a near field radio-frequency identification (RFID) system in which each physical key has an RFID transponder and automated key station 800 has an associated receiver. By this means, automated key station 800 identifies and records keys by their Key ID (KID) as they are returned.

Figure 3A:
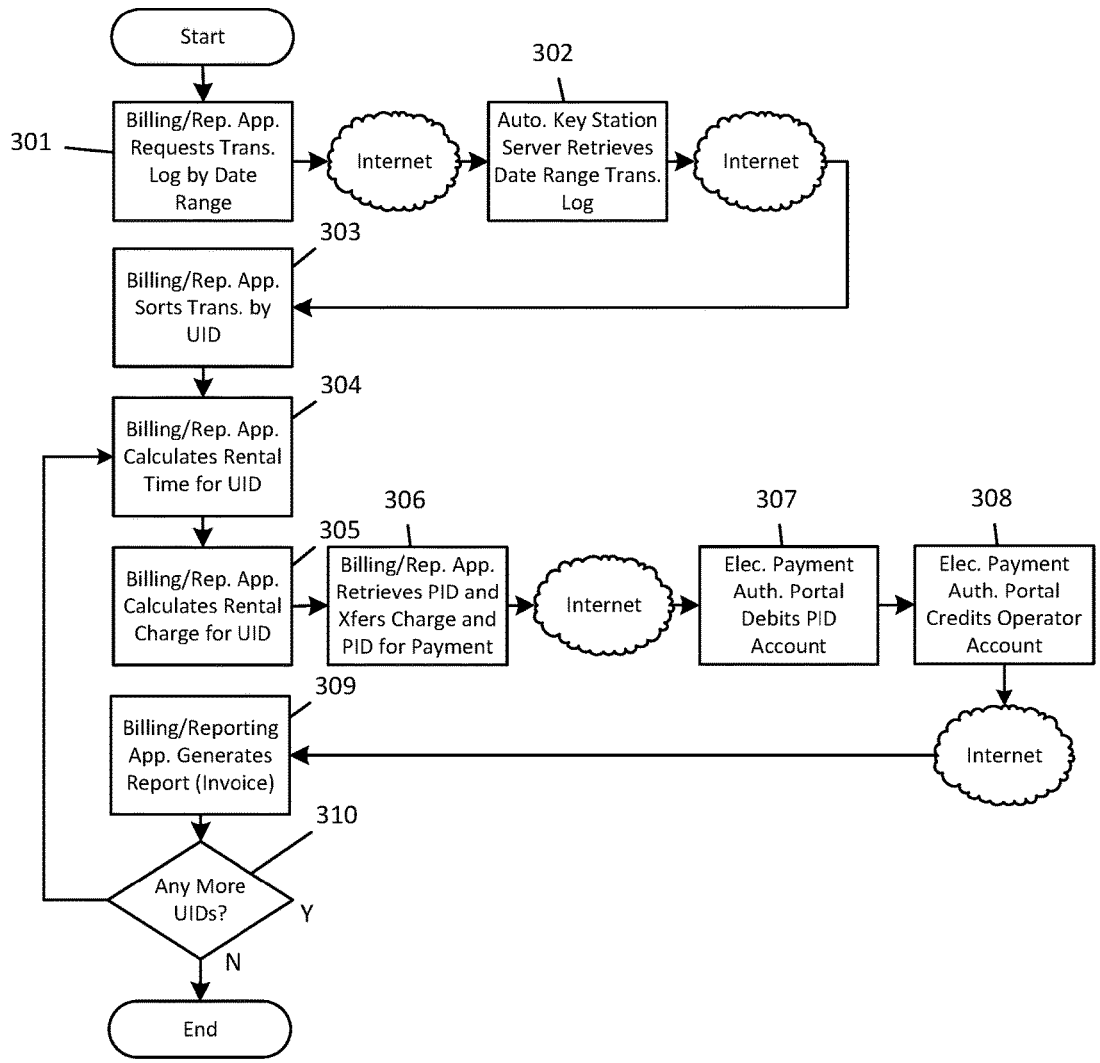
FIG. 3a is a flow diagram illustrating the automated functionality of the billing/reporting application.

Referring now to FIGS. 1 and 3a, periodically thereafter, billing/reporting application 300 executes a C# program that generates a query directed to a particular automated key station server 700 requesting the transaction log for a particular date range, say for a particular month or week (301). The transaction log generated by automated key station server 700 is retrieved and forwarded back to billing/reporting application 300 (302). Next, billing/reporting application 300 sorts the returned transaction log by User ID (UID) and stores the transactions in SQL database 100 indexed by User ID (UID) (303). Next, billing/reporting application 300 correlates all new rental transaction records against matching new return transaction records for a particular User ID (UID), calculates the total rental time for a particular user for the selected period of time, and stores it in SQL database 100 by User ID (UID) (304). Next, billing/reporting application 300 calculates the rental charge for a particular User ID for the selected period of time and stores it in SQL database 100 by User ID (UID)(305). Next, billing/reporting application 300 retrieves the Profile ID (PID) associated with the User ID (UID) rental charges were just calculated for and forwards the calculated the rental charge and Profile ID (PID) to electronic payment authorization portal 600 (306). Next, electronic payment authorization portal 600 debits the electronic payment source associated with the rental user associated with the Profile ID (PID) (307). Next, electronic payment authorization portal 600 credits the electronic payment repository associated with the system operator, generates a status indicator indicating that payment was successfully processed, and transfers it back to billing/reporting application 300 (308). Next, billing/reporting application 300 stores the status indicator by User ID (UID) and generates a report. Typically this would take the form of an email message emailed to the email address associated with the user associated with User ID (UID) and Profile ID (PID) indicating that payment was successfully completed (309). Finally, if there are additional User IDs (UIDs) for which rental transaction records and return transaction records remain unprocessed they are processed sequentially in turn (310). Those having skill in the art will recognize that the aforementioned step-wise sequential method is, of course, not the only way the described process may be implemented. For example, processes that associate pairs of Profile IDs (PIDs) and calculated rental charges together for many users and "batches" a group of them to electronic payment authorization portal 600 for processing in bulk is functionally equivalent.

Figure 3B:
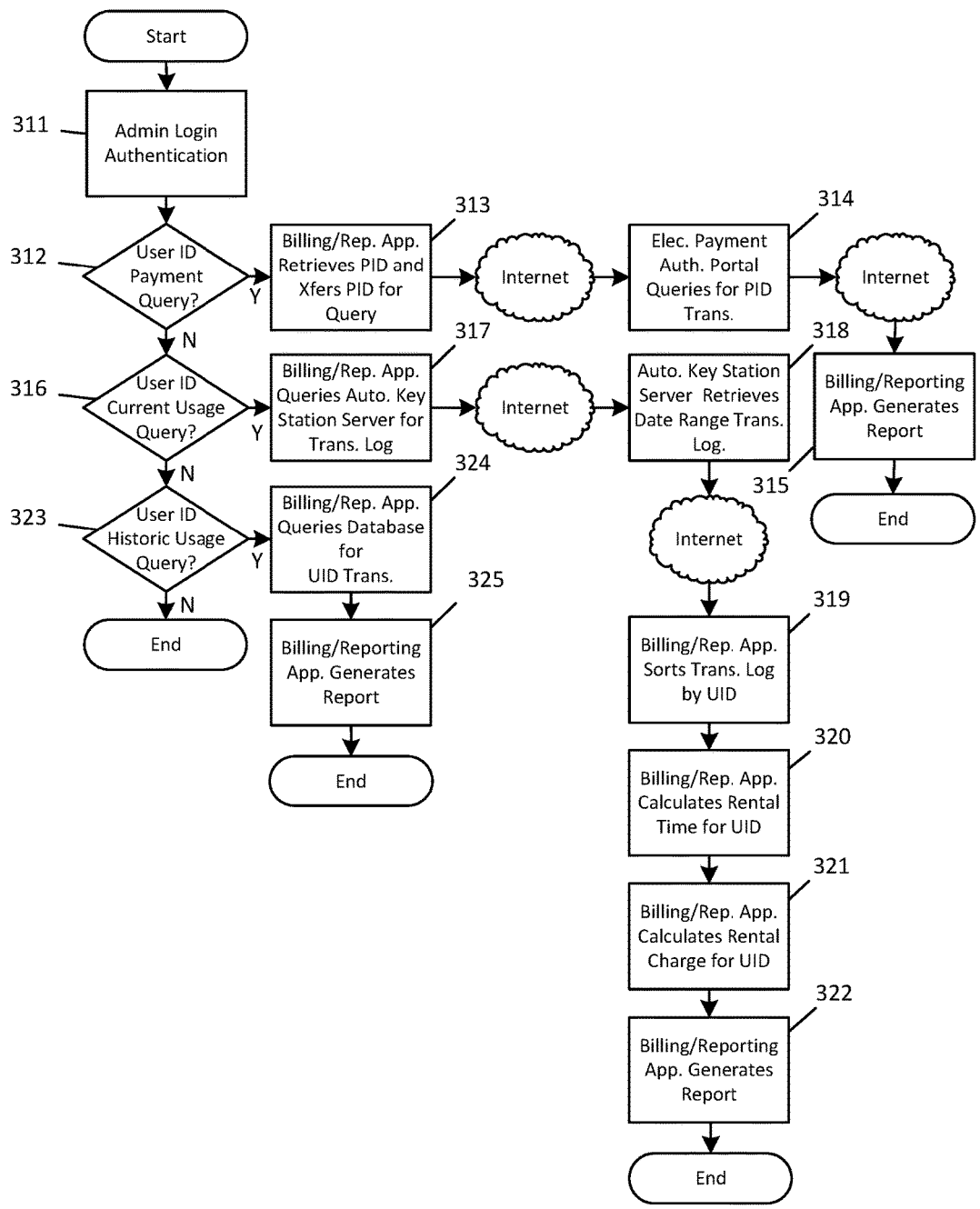
FIG. 3b is a flow diagram illustrating the ad-hoc functionality of the billing/reporting application.

Referring now to FIGS. 1 and 3*b*, occasionally it may be necessary to inspect a user's account on an ad-hoc basis unrelated to the normal system billing cycle. If so, a system operator can access billing/reporting application 300 and execute an ASP.NET/C# program generating a web interface whereby the system operator may execute queries and generate reports directed to current, unbilled account status and historic, billed account status for a particular user. To do this, the system operator first authenticates his or her identity by means of a password or other authentication step (311). The system operator may then select from a series of queries/reports that may be generated.

For example, the system operator may choose to generate a report detailing a particular user's payment status (312). The system operator first provides the user's User ID (UID) and billing/reporting application 300 retrieves the user's Profile ID (PID) from SQL database 100 and transfers it in the form of a query to electronic payment authorization portal 600 (313). Next, electronic payment authorization portal 600 (313) queries for transactions made by the user associated with the User ID (UID) and returns them billing/reporting application 300 (314). Next, billing/reporting application 300 generates an appropriate report detailing the user's transaction and payment history (315).

Similarly, the system operator may choose to generate a report detailing a particular user's current, unbilled account status (316). The system operator first provides the user's User ID (UID) and billing/reporting application 300 retrieves the identity of the automated key station server 700 associated with the one or more automated key stations 800 from whence the user rents bicycles and requests a date range limited transaction log for the date range presently unbilled from the appropriate automated key station server 700 (317). Next, the selected automated key station server 700 retrieves the date range limited transaction log and transfers it to billing/reporting application 300 (318). Next, billing/reporting application 300 sorts the returned transaction log by User ID (UID) (319). Next, billing/reporting application 300 correlates all unbilled rental transaction records against matching unbilled return transaction records for a particular User ID (UID) and calculates the total rental time for a particular user for the unbilled period (320). Next, billing/reporting application 300 calculates the rental charge for the user for the unbilled period of time (321). Next, billing/reporting application 300 generates an appropriate report detailing the user's unbilled account status (322).

Similarly, the system operator may choose to generate a report detailing a particular user's historic, billed account status (323). The system operator provides the user's User ID (UID) to billing/reporting application 300 which uses it to retrieve information pertaining to the user's historic account status from SQL database 100 (324). Next, billing/reporting application 300 generates an appropriate report detailing the user's transaction and payment history (325).

Figure 3C:
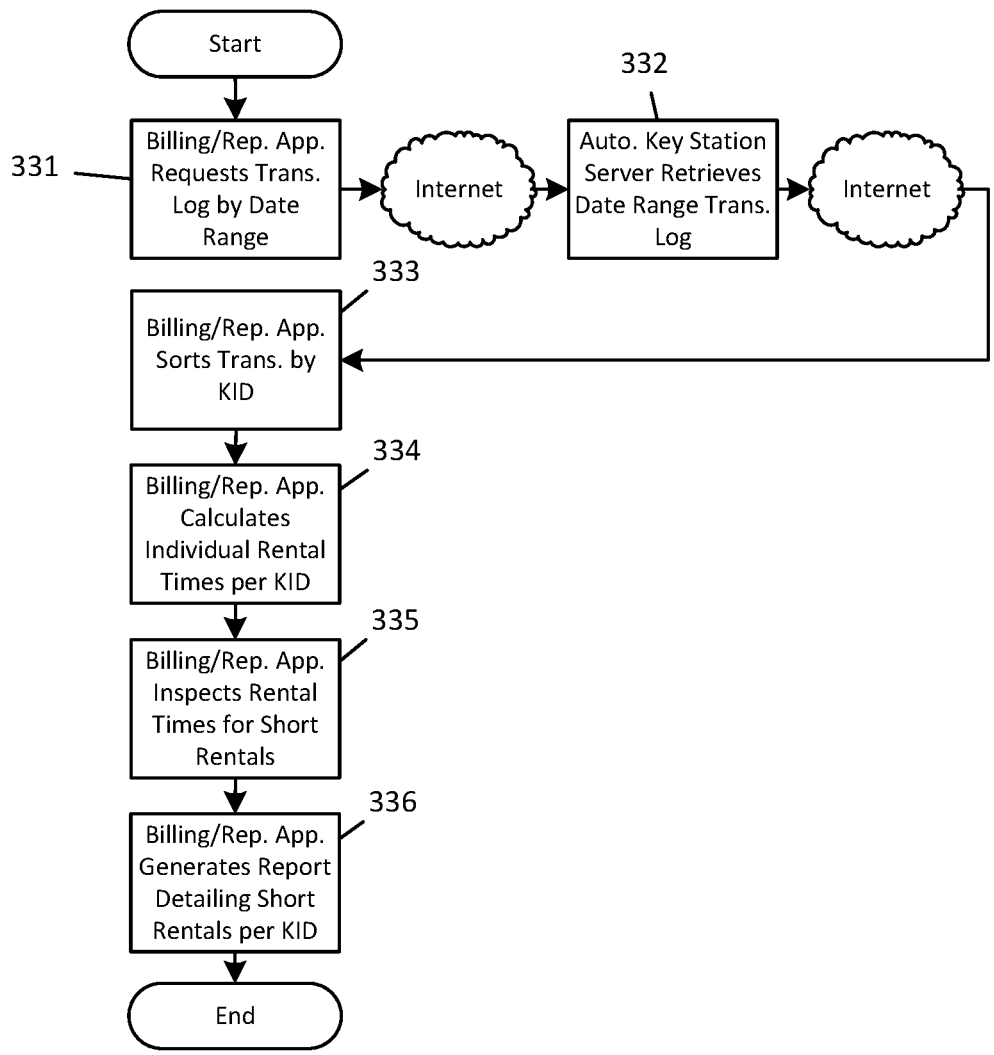
FIG. 3c is a flow diagram illustrating the indirect fleet shrinkage detection functionality of the billing/reporting application.

Referring now to FIGS. 1 and 3*c*, periodically thereafter billing/reporting application 300 executes a C# program that generates a query directed to a particular automated key station server 700 requesting the transaction log for a particular date range, say for a particular month or week (331). The transaction log generated by automated key station server 700 is retrieved and forwarded back to billing/reporting application 300 (332). Next, billing/reporting application 300 sorts the returned transaction log by Key ID (KID) and stores the transaction records in SQL database 100 indexed by Key ID (KID) (333). Next, billing/reporting application 300 correlates all new rental transaction records against matching new return transaction records for a particular Key ID (KID), calculates the individual rental times for a particular locked asset for the selected period of time, and stores them in SQL database 100 by Key ID (KID) (334). Next, billing/reporting application 300 inspects the calculated individual rental times time for each particular Key ID (KID) for the selected period of time to determine which locked assets suffered at least one short rental, i.e. rental times of less than about 10 minutes (335). Such short rental transactions are usually not indicative of actual rental transactions but are instead indicative of a locked asset that is no longer present at the rental station, i.e. a key was dispensed to the user, the user was unable to locate the locked asset associated with the dispensed key and subsequently returned the key to automated key station 800. By the same token, such short rental cycles may indicate that that a locked asset has been damaged and is no longer deemed suitable for rental by users and thus must be repaired or replaced. Next, billing/reporting application 300 generates a report detailing Key IDs (KIDS) of locked assets that have suffered short rentals (336). Next, a physical inventory of the rental station may be conducted and in the case of a missing locked asset recovery operations may commence with the renter associated with the last rental transaction of nominal length. If a damaged locked asset is determined to have suffered one or more short rental cycles it may be recovered and repaired or replaced.

Figure 4:
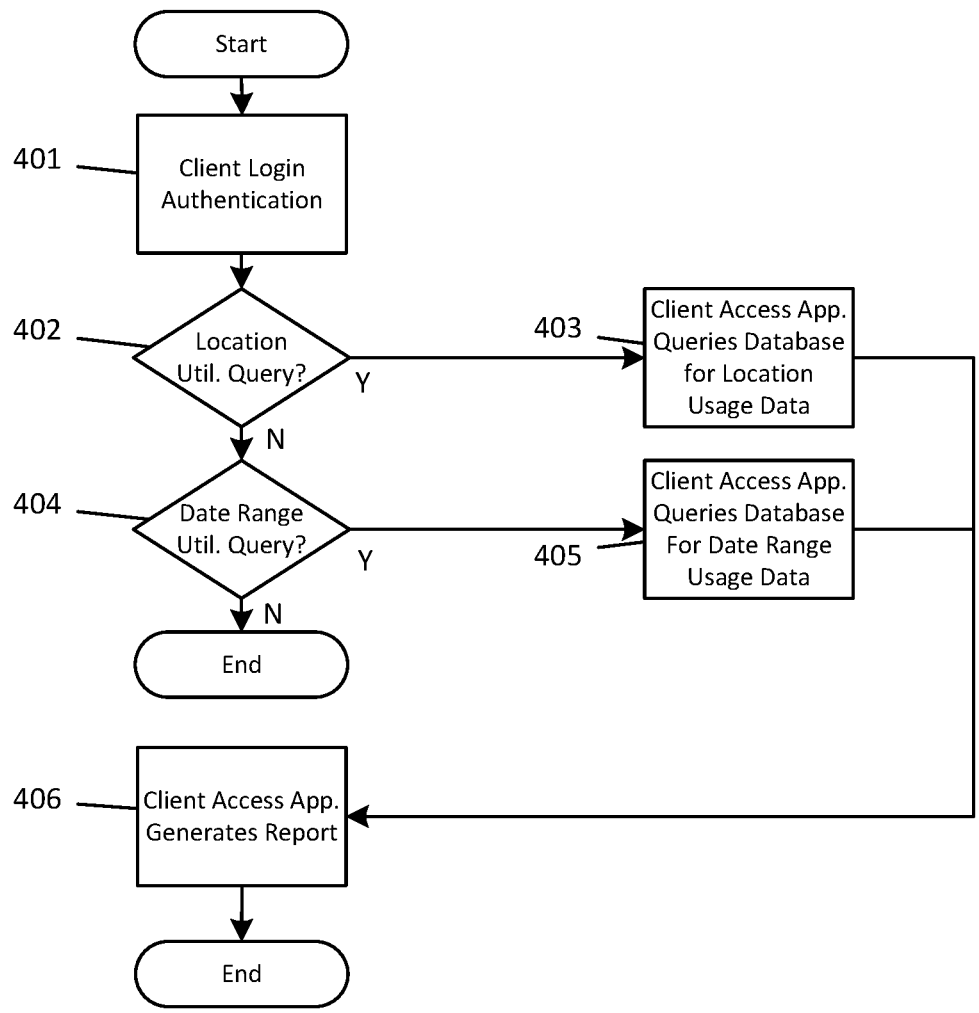
FIG. 4 is a flow diagram illustrating the functionality of the client access application.

Referring now to FIGS. 1 and 4, from time-to-time the institutional partner (client) of the service operator may wish to receive information regarding the utilization and acceptance of the service provider's locked asset rental system as it is used by individuals (students, customers, etc.) affiliated with the institutional partner. To this end a client can use client access application 400 and execute an ASP.NET/C# program generating a web interface whereby the client may execute queries and generate reports directed to current and historic utilization of the service provider's locked asset rental system by individuals affiliated with the institutional partner. To do this, the client first authenticates his or her identity by means of a password or other authentication step (401). The client may then select from a series of queries/reports that may be generated.

For example, the client may choose to generate a report detailing a utilization of the system by a particular automated key station server 700 or by a particular automated key station 800 (402). The client provides the identity of a particular automated key station server 700 or automated key station 800 to client access application 400 which uses it to retrieve information pertaining to the service operator's historic usage records associated with the particular automated key station server 700 or particular automated key station 800 from SQL database 100 (403). Next, client access application 400 generates an appropriate report detailing the service operator's historic usage records (406).

Similarly, the client may choose to generate a report detailing how individuals affiliated with the client's institution utilized the locked asset rental system during a particular date range (404). The client provides the date range desired to client access application 400 which uses it to retrieve information pertaining to the service operator's historic usage records during the date range specified from SQL database 100 (405). Next, client access application 400 generates an appropriate report detailing the service operator's historic usage records during the selected date range (406).

Figure 5:
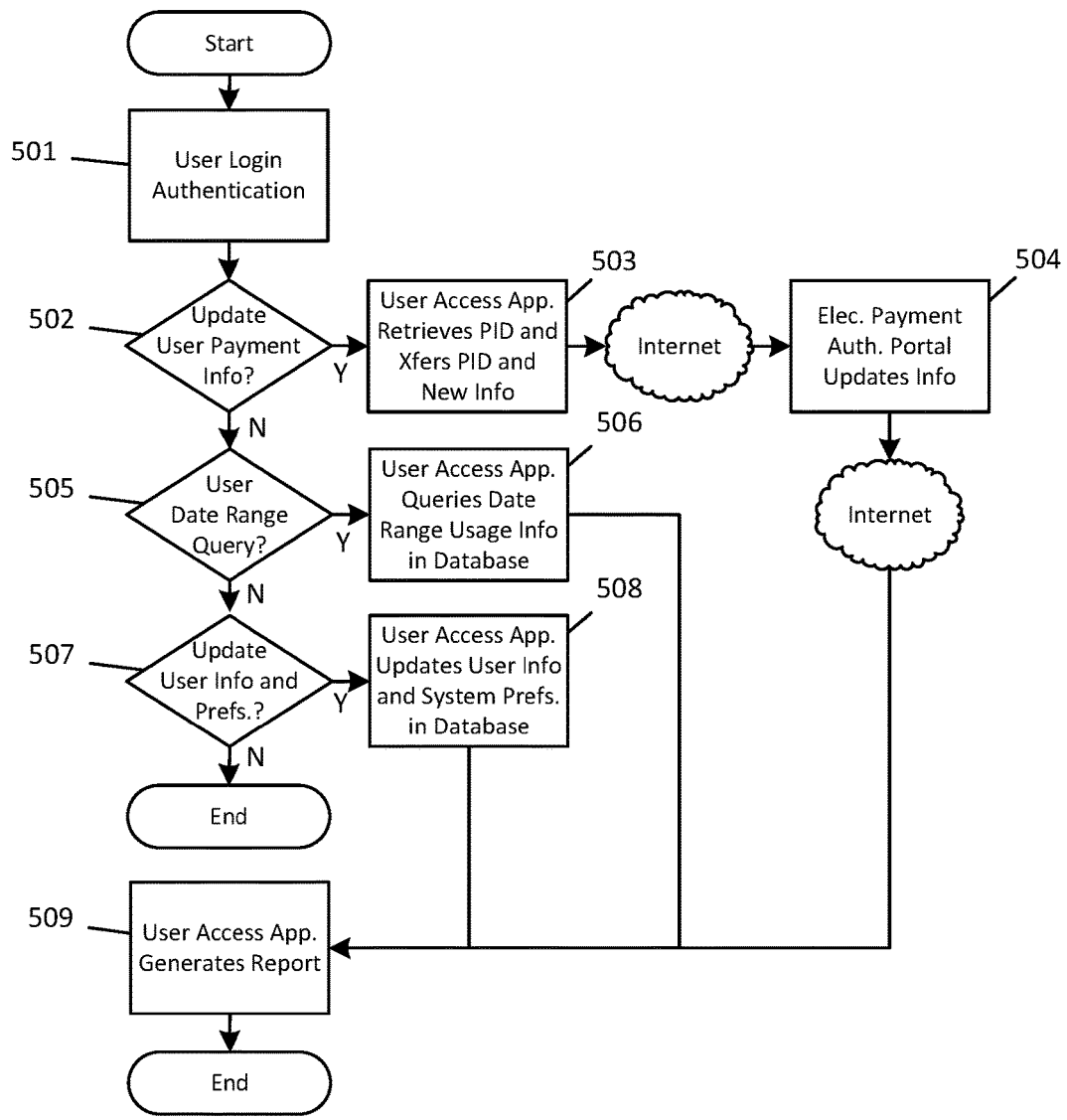
FIG. 5 is a flow diagram illustrating the functionality of the user access application.

Referring now to FIGS. 1 and 5, users must have access to the system from time-to-time to perform various tasks including updating their electronic payment source, checking their usage history, and changing their contact information and system preferences. To this end, a user accesses user access application 500 and executes an ASP.NET/C# program generating a web interface whereby the user may alter and inspect this information. To do this, the user first authenticates his or her identity by means of a password or other authentication step (501). The client may then select from a series of actions that he or she may perform.

For example, the user may wish to alter payment source information regarding a credit card or debit card stored and used by electronic payment authorization portal 600 (502). After entering the necessary information regarding the new credit or debit card, the user's User ID (UID) is used to retrieve the user's Profile ID (PID) from SQL database 100 and all this information is transferred to electronic payment authorization portal 600 (503). Electronic payment authorization portal 600 updates the user's preferred payment method in its SQL database and generates a status indicator indicating that the user's payment method was successfully updated, and transfers it back to user access application 500 (504). Next, user access application 500 stores the status indicator by User ID (UID) and generates a report. Typically this would take the form of a screen indication or message indicating that the payment method was successfully updated (509).

Similarly, the user may choose to generate a report detailing the his or her utilization of the locked asset rental system during a particular date range (505). The user provides the date range desired to user access application 500 which uses it to retrieve information from SQL database 100 pertaining to the user's historic usage during the date range specified (506). Next, user access application 500 generates an appropriate report detailing the user's usage during the selected date range (509).

Similarly, the client may choose to alter his or her contact information such as name, address, email address, etc., and/or certain system preferences such as the key station location from which the user wishes to rent locked assets (507). The user provides any contact and/or preference information to be updated to user access application 500 which stores it in SQL database 100 (508). Next, user access application 500 generates an appropriate report detailing the updates made (509).

While the present invention has been described in what are thought to be the most useful and practical embodiments, it will be readily apparent to those having skill in the art that other variations may be readily conceived and created. For example, some locked assets (e.g. bicycles, automobiles, computers, and tablet computers) are large enough that advertising and personalization content may be affixed to the asset. Such advertising and personalization content may be created remotely by the user by means of a website and automatically prepared for subsequent application to the asset. Similarly, various usage monitoring programs may be constructed in conjunction with the system. For example, the usage patterns of users (e.g. identifying the geographic areas or locations where particular locked assets are used) will be of interest to system operators. Thus, a system operator may affix a GPS transceiver to particular locked assets to determine where and when they are used. Similarly, a system operator may use a GPS transceiver built into a particular locked asset (such as a computer, tablet computer, or telephone) to determine where and when they it used. Similarly, a marketing program in which the user permits the system operator to monitor the user's location by means of an app installed on the user's smart phone in return for free or reduced rate rental services may be constructed. Accordingly, these and all such other readily conceived and created variations are implicitly included in the spirit and scope of the present disclosure.

What is claimed is:
1. A locked asset rental system comprising:
a) at least one network connected, remotely accessible and operable key station wherein said key station further comprises key panel, a card reader, a means of selectively dispensing, identifying via a wireless RFID system installed in the key, and securely storing at least one key, and an operating program capable of:
 i. creating an authorized user profile and generating a User ID (UID) and PIN identifying said authorized user;
 ii. maintaining a list of said authorized users and their respective User IDs (UIDs) and PINs;
 iii. collecting keystrokes from said key panel representing a User ID (UID) and PIN and dispensing a particular key to the authorized user identified by the provided User ID (UID) and PIN;
 iv. identifying via a wireless RFID system installed in the key and securely storing said key when it is returned;
 v. maintaining a transaction log containing:
  (1) the Key ID (KID) of a particular key and the authorized user to whom it was dispensed and when it was dispensed;
  (2) the Key ID (KID) of a particular key and when it was returned;
 vi. communicating said transaction log when requested by a billing/reporting application operating on a network attached controller;
 vii. associating identifying data read by means of said card reader with a particular User ID and PIN, such that a user may access said key box and retrieve and return a key by means of a card read in lieu of providing a User ID (UID) and PIN;
 viii. determining if a short rental cycle has occurred wherein a short rental cycle of less than about 10 minutes duration is indicative of missing or damaged equipment associated with a key identified by the particular Key ID (KID);
b) a web server implemented website capable of collecting identifying information associated with a particular user, said website further comprising:
 i. an SQL database;
 ii. an electronic payment authorization portal;
 iii. wherein said website is capable of creating a new user profile in said SQL database by:

(1) communicating with said electronic payment authorization portal providing said identifying information associated with a particular user causing it to:
  (a) create a Profile ID (PID) for said new user;
  (b) solicit and record an electronic payment account from and for said new user;
  (c) associate said Profile ID (PID) with said electronic payment account; and
  (d) returning said Profile ID (PID) to said website;
(2) associating said Profile ID (PID) with said user profile;
(3) instructing said key station to create an authorized user profile for said new user and return a User ID (UID) and PIN for said new user;
(4) associating said User ID (UID) and said PIN with said user profile;

c) a web server implemented billing/reporting application capable of periodically billing the user for unpaid rental fees by:
  i. communicating with said at least one key station and retrieving said transaction log;
  ii. totaling, on a User ID (UID) basis, the amount of time one or more keys had been dispensed to a particular user during an arbitrary billing period;
  iii. calculating the total charge incurred by the user during said billing period; and
  iv. communicating the user's Profile ID (PID) and total unbilled charge to said electronic payment authorization portal causing said user's electronic payment account to be debited in favor of the system operator.

2. A locked asset rental system of claim 1 in which the locked assets are bicycles.

3. A locked asset rental system of claim 1 in which the locked assets are motorcycles.

4. A locked asset rental system of claim 1 in which the locked assets are automobiles.

5. A locked asset rental system of claim 1 in which the locked assets are tools.

6. A locked asset rental system of claim 1 in which the locked assets are machines.

7. A locked asset rental system of claim 1 in which the locked assets are computers.

8. A locked asset rental system of claim 1 in which the locked assets are smart phones.

9. A locked asset rental system of claim 1 in which the locked assets are tablet computers.

10. A locked asset rental system of claim 1 in which the card reader is a magnetic swipe card reader.

11. A locked asset rental system of claim 1 in which the card reader is a smart card reader.

12. A locked asset rental system of claim 1 wherein said web server implemented billing/reporting application is capable of periodically determining when a particular locked asset has gone missing or has been damaged by:
  i. communicating with said at least one key station and retrieving said transaction log;
  ii. calculating on a Key ID (KID) basis the individual rental times ascribed to each Key ID (KID);
  iii. filtering the individual rental times ascribed to each Key ID (KID) to determine which Key IDs (KIDs) have suffered short rental cycles; and
  iv. generating a report recording the Key IDs (KIDs) that have suffered short rental cycles
  wherein a short rental cycle of less than about 10 minutes duration is indicative of missing or damaged equipment associated with a key identified by the particular Key ID (KID).

13. A locked asset rental system of claim 1 generating a report detailing the utilization of the system by a particular automated key station server.

14. A locked asset rental system of claim 1 generating a report detailing the utilization of the system by a particular automated key station.

* * * * *